June 17, 1941.  H. KLAUCKE  2,245,925
CHAIN DRIVE AND TAKE-UP THEREFOR
Filed Oct. 12, 1939
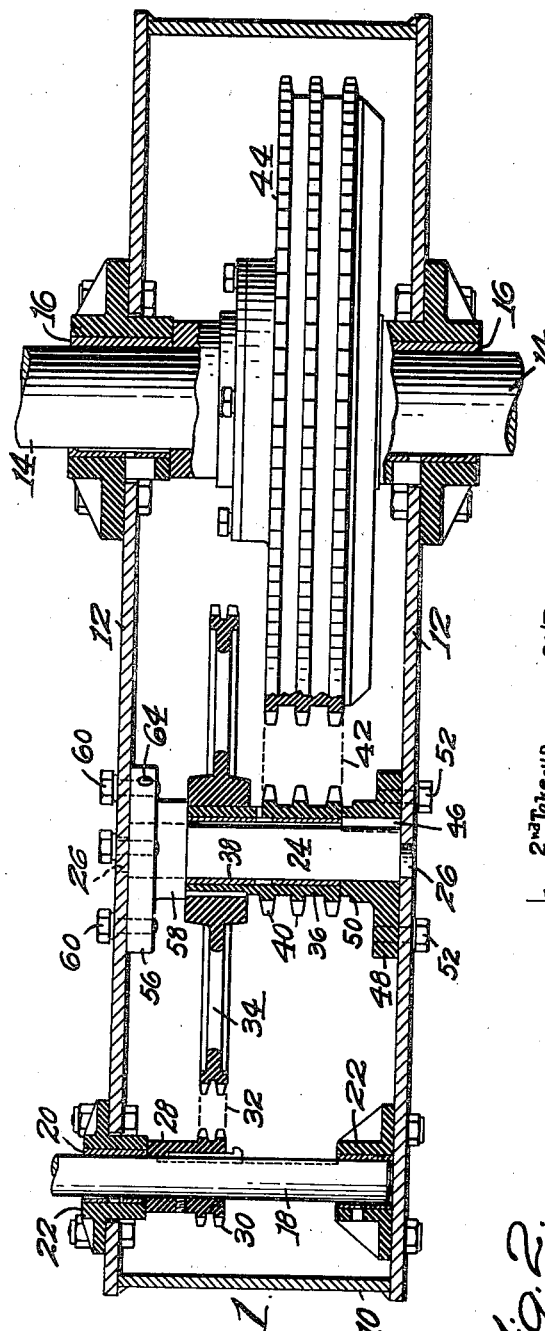
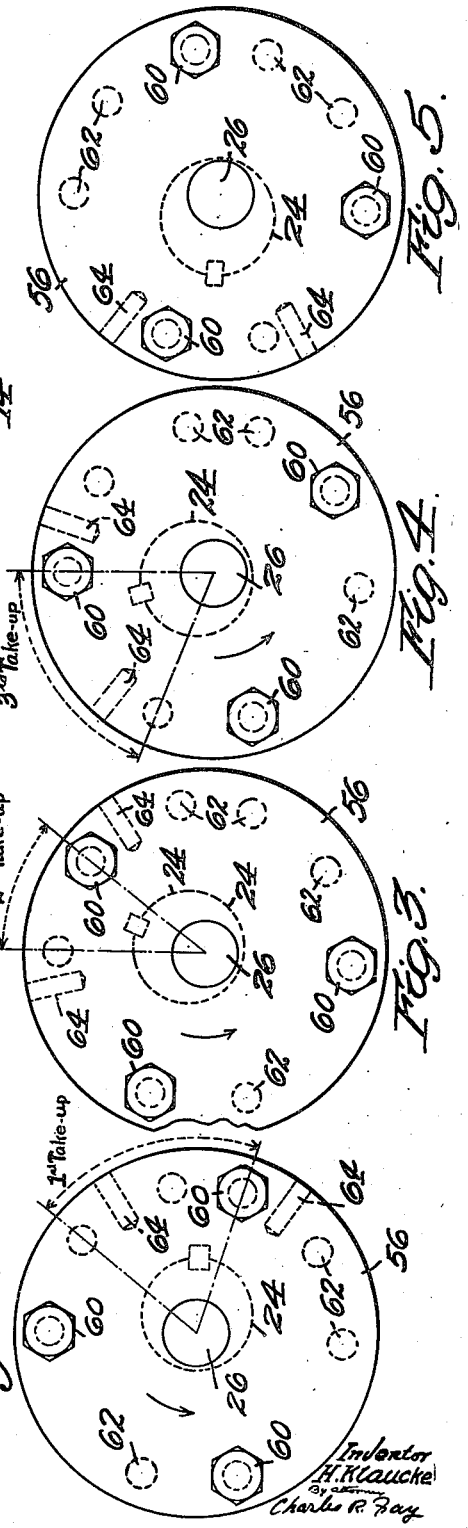
Inventor
H. Klaucke
By
Charles R. Fay Patented June 17, 1941

2,245,925

UNITED STATES PATENT OFFICE 2,245,925

CHAIN DRIVE AND TAKE-UP THEREFOR

Hermann Klaucke, Worcester, Mass., assignor to Chain Belt Company, Milwaukee, Wis., a corporation of Wisconsin Application October 12, 1939, Serial No. 299,184

5 Claims. (Cl. 74—242.16)

This invention relates to a chain drive and a take-up device therefor, especially adapted for driving a deep-well pump of the type used in oil wells. Difficulty has been encountered in providing for the take-up of the driving chains in such drives, those at present in use being bulky, awkward to handle, and comparatively inefficient. It is necessary to provide a take-up because of the tremendous power and shock put on the parts, and especially on the chains of speed reducers for deep-well pumps.

Objects of this invention include the provision of means to obviate the above mentioned difficulties; the provision of a chain drive having a chain take-up of simple, efficient, and inexpensive character; the provision of an eccentrically mounted power transmission shaft between the driving and driven shafts whereby rotary adjustment will take up the loose chain between said transmission shaft and the driven shaft; the provision of a hollow sleeve on said transmission shaft provided with large and small sprockets; the provision of novel means to rotatably adjust the eccentric shaft; and the provision in combination with the foregoing of a cushion wheel sprocket for the driven shaft.

Other objects and advantages of the invention will appear hereinafter.

Of course, it is to be understood that drives other than chains may be used with the device embodying the subject matter of this invention.

Reference is to be had to the accompanying drawing, in which

Fig. 1 is a plan view of the entire device with parts in section; and

Figs. 2, 3, 4, 5 show the adjusting plate in its various positions of adjustment.

Referring to the drawing in detail, it will be noted that a gear box 10 is used to enclose the entire device. This box may be made of welded members for lightness and convenience, and is provided with a detachable cover, not shown, for exposing all the parts. Journaled in the sides 12 of box 10 there is a driven shaft 14 in bearings 16, and a driving shaft 18 is journaled in the bearing 20 and bearing bracket 22. Intermediate these shafts there is located a transmission shaft 24 journaled in the sides 12 of the box on eccentrically positioned studs 26.

The driving shaft 18 has keyed thereto a collar 28 carrying sprocket teeth 30 for driving a narrow chain 32 of desired form, the chain 32 driving a large diameter sprocket wheel 34 keyed to a sleeve 36 rotatably mounted on shaft 24 by the bearing sleeves 38. The sleeve 36 is provided with teeth 40 on a smaller radius than the wheel 34 and drives a wide chain 42, which in turn drives the sprocket wheel 44. The wheel 44 drives the shaft 14 through a cushioning medium of the type disclosed in the co-pending application, Serial No. 299,183, filed October 12, 1939.

The shaft 24 is keyed at one end as at 46 to a round plate 48 having an outstanding annulus 50 serving as an end-thrust abutment for the sleeve 36. The plate 48 is bolted to the side of the gear box by bolts 52, and there is provided a series of bolt holes in the side of the box to locate the bolts 52 in various positions of rotary adjustment of the shaft 24.

Shaft 24 is similarly keyed at its other end to a round plate 56, having an outstanding annulus 58 similar to that at 50 and serving as an end-thrust abutment for the other end of the sleeve 36 and wheel 34. The plate 56 is bolted to the gear box by bolts 60 in a manner similar to the attachment of plate 48, and the side of the box is provided with holes 62, as illustrated in general in relation to the plate 56 in Figs. 2 to 5, inclusive, to locate the bolts and the shaft 24 in rotary adjustment of the latter. These bolt holes are arranged at distances according to a desired predetermined degree of adjustment of the shaft 24. The plate 56 is provided with one or more borings 64 for the insertion of a rod (not shown) whereby the plate 56 and therefore shaft 24 may be rotated to the desired degree. Of course, either the walls 12, or the plates 48, 56 may be provided with the holes 62, but in the present case it is deemed desirable to place them in the walls 12.

Referring to Fig. 2, the plate 56, bores 64, and bolts 60 are shown in the initial position of adjustment; i. e., the shaft 24 is located as far to the right as possible, so that the shortest possible chain 42 may be used. The mechanism will be used in this position of adjustment until a loosening of chain 42 occurs. Incidentally, the cushion wheel 44 will absorb most of the shock and strain on the system, some being transmitted to the chain 42, but little, if any, to chain 32.

Fig. 2 also indicates the amount of angular travel of the plate 56, as shown by the arrow, in the "1st take-up." When the plate 56 is moved through this angle, the bolts 60 have moved through the same angle to the positions indicated in Fig. 3, and the bolts are then placed in the corresponding holes 62 provided at predetermined locations. The second run of the mechanism takes place with the shaft 24, as shown in this figure.

Fig. 3 also indicates the amount of angular travel of the plate 56, for the "2nd take-up," and when this is done, the parts 60 and 24 will be in position, as shown in Fig. 4. The second take-up is shorter in angular travel than the first take-up, but due to the position of studs 26 relative to shaft 24, the axis of said shaft has moved horizontally to the left the same amount in both take-ups.

Fig. 4 also indicates the amount of angular travel of plate 56 due to the "3d take-up," which is the same as the first take-up, the shaft 24 assuming the final position, as shown in Fig. 5. Each bolt 60 and plate 56 has now been turned through 180 degrees, and the shaft 24 has turned from its position nearest to shaft 14, as shown in Fig. 2, to its position farthest from said shaft, as shown in Fig. 5. The three take-ups move the axis of the shaft 24 to the left equal amounts, and the mechanism may be run four times before anything else is necessary to take care of the loosening of the chain 42.

Since the distance between the secondary drive centers (i. e., between the centers of shafts 14 and 24) is lengthened, the distance between the primary drive centers (i. e., between the centers of shafts 18 and 24) is correspondingly shortened. To take care of the resultant looseness in chain 32, a link is removed by well-known means at each adjustment.

After shaft 24 has been adjusted three times, a link may be removed from chain 42, and this process is repeated until the chain wears out.

Having thus described my invention and the advantages thereof, I do not wish to be limited to the details herein disclosed, otherwise than as set forth in the claims, but what I claim is:

1. In a device of the class described, a support having parallel walls, a shaft journaled in said walls upon eccentric end studs for lateral movement of said shaft, a plate at each end of said shaft secured thereto, a plurality of bolt holes in each plate, a plurality of apertures in said side walls to receive bolts whereby said plates may be secured to said walls in various angular positions, said apertures being unequally spaced in such a manner as to ensure that said shaft will be laterally moved in equal steps by change in said angular positions.

2. In a device of the class described, two parallel supports, a shaft eccentrically journaled in end studs in said supports, a plate at either end of said shaft and connected thereto adjacent said supports, a series of apertures in said supports concentrically arranged with respect to said studs, means passing through selected ones of said apertures and said plates to secure said plates in predetermined angularly adjusted positions, said apertures being unequally spaced so that said adjusted positions provide for lateral movement of said shaft in equal amounts at each adjustment.

3. In a device of the class described, three shafts arranged parallel to each other in the same general plane so that one shaft is located intermediate the other two shafts, the outside shafts being equipped with sprocket wheels and corresponding chains for operative connection to two sprockets on the intermediate shaft, said two sprockets being mounted on a sleeve rotatably mounted on said intermediate shaft whereby said outside shafts may be driven the one from the other without rotating the intermediate shaft, the intermediate shaft being rotatably mounted for lateral movement on two eccentric studs at the ends thereof, a disc at each end of said intermediate shaft keyed thereto, detachable means to secure said discs to a support, a radial boring in one disc, whereby the discs and intermediate shaft may be rotated to various predetermined positions of angular adjustment, certain of said positions being unequally arranged so that the degree of angular adjustment is variable, and the degree of lateral adjustment of said shaft is fixed.

4. In a device of the class described, a gear box having walls, a solid cylindrical shaft extending between said walls, eccentric studs of less diameter than said shaft integral therewith at its ends, said studs being journaled in said walls, whereby rotation of said shaft will move the same effectively laterally, means to adjustably rotate said shaft including plates secured to said shaft inwardly of said studs and eccentric to said shaft oppositely to the eccentricity of said studs with respect to said shaft, so that said plates are concentric with said studs, means to secure said plates to the interior surfaces of said walls and including locating devices arranged so that each rotational adjustment of said shaft will be restricted to result in equal lateral movements of said shaft.

5. In a device of the class described, a gear box having walls, a solid cylindrical shaft extending between said walls, eccentric studs integral with said shaft at its ends, said studs being journaled in said walls, whereby rotation of said shaft will move the same effectively laterally, means to adjustably rotate said shaft including a plate secured to said shaft and eccentric thereto, means to adjustably secure said plate to the surface of one of said walls, said last named means comprising a locating bore in said plate and a series of bores in said one wall, at least some of the bores of said series being unequally spaced so as to ensure that rotational movement of said shaft will provide equal lateral steps of adjustment thereof when said bores are successively alined, and means to enter alined bores to lock said plate to said one wall.

HERMANN KLAUCKE.